United States Patent [19]
des Vallieres et al.

[11] Patent Number: 6,101,446
[45] Date of Patent: Aug. 8, 2000

[54] METHOD FOR CHARTING DRILLABLE ZONES IN AN OILFIELD AVOIDING ANOMALY ZONES

[75] Inventors: Thierry des Vallieres, Boulogne; Helmut Kuhn, Aubertin; Didier Parron, Buziet; Yves Lafet, Paris, all of France

[73] Assignees: Total, Puteaux; Elf Aquitance Production, Paris la Defense, both of France

[21] Appl. No.: 09/171,987

[22] PCT Filed: Apr. 30, 1997

[86] PCT No.: PCT/FR97/00774

§ 371 Date: Mar. 30, 1999

§ 102(e) Date: Mar. 30, 1999

[87] PCT Pub. No.: WO97/41455

PCT Pub. Date: Nov. 6, 1997

[30] Foreign Application Priority Data

Apr. 30, 1996 [FR] France ................................ 96 05437

[51] Int. Cl.[7] .................................................. G01V 1/30
[52] U.S. Cl. ................................... 702/11; 367/72
[58] Field of Search ............................... 702/11; 367/35, 367/36, 75, 72

[56] References Cited

U.S. PATENT DOCUMENTS

| | | | |
|---|---|---|---|
| 4,573,148 | 2/1986 | Herkenhoff et al. | 367/47 |
| 4,817,061 | 3/1989 | Alford et al. | 361/75 |
| 5,148,494 | 9/1992 | Keskes | 382/1 |
| 5,153,858 | 10/1992 | Hildebrand | 367/72 |
| 5,588,032 | 12/1996 | Johnson et al. | 378/8 |
| 5,596,547 | 1/1997 | Bancroft et al. | 367/51 |

FOREIGN PATENT DOCUMENTS 562 687  9/1993  European Pat. Off. ................... 702/1

Primary Examiner—Christine K. Oda
Assistant Examiner—Victor J. Taylor
Attorney, Agent, or Firm—Sughrue, Mion, Zinn, Macpeak & Seas, PLLC

[57] ABSTRACT

The charting method consists in realising a recordings acquisition, constituting on the basis of the recorded seismic traces, a 3D seismic block (X, Y, T) sampled in elementary cells ($C_{ijk}$), such that each elementary cell contains a sample (k) of a central seismic trace ($TR_{ij}$), calculating for each elementary cell ($C_{ijk}$) of the seismic block, the energy thereof, and fixing an energy threshold beyond which the presence Tk of anomaly zones is considered probable, selecting cells of the block which have energy equal or superior to the said threshold, coding the selected cells, such that all the cells belonging to a same contiguously selected cell set have the same code and the selected cells belonging to distinct contiguously selected cell sets have different codes, and effecting an XY projection of the coded cell block.

4 Claims, 5 Drawing Sheets

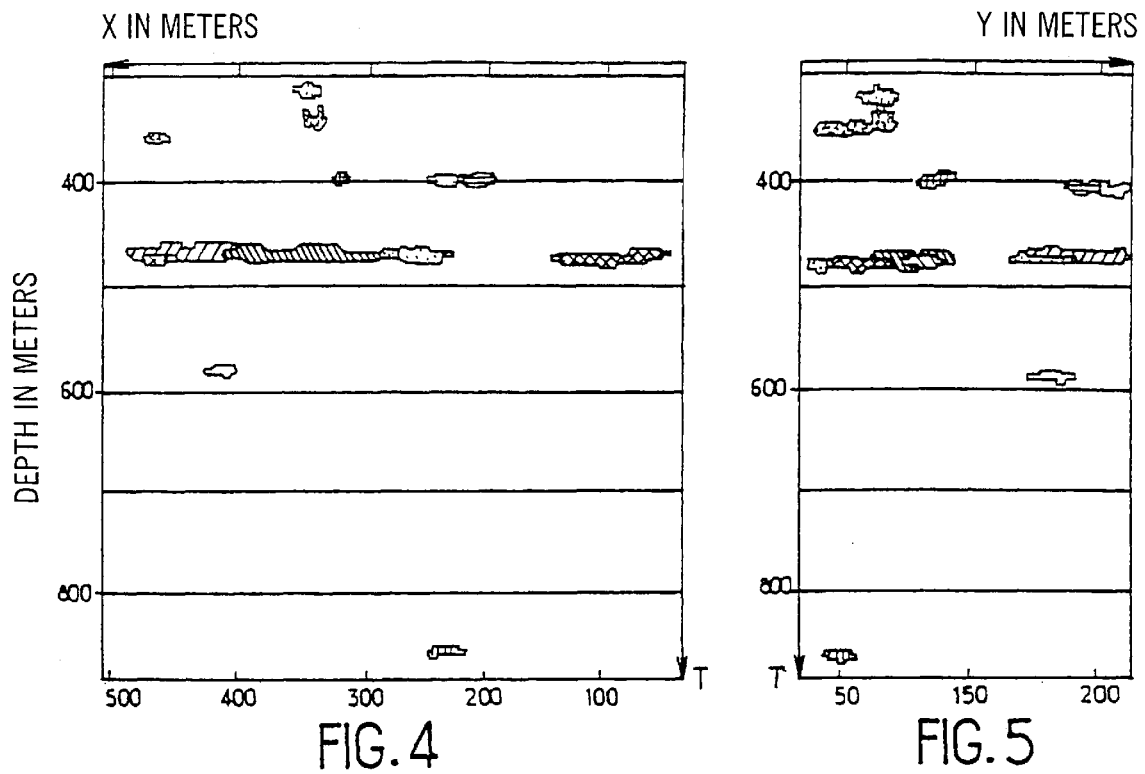
FIG. 4
FIG. 5
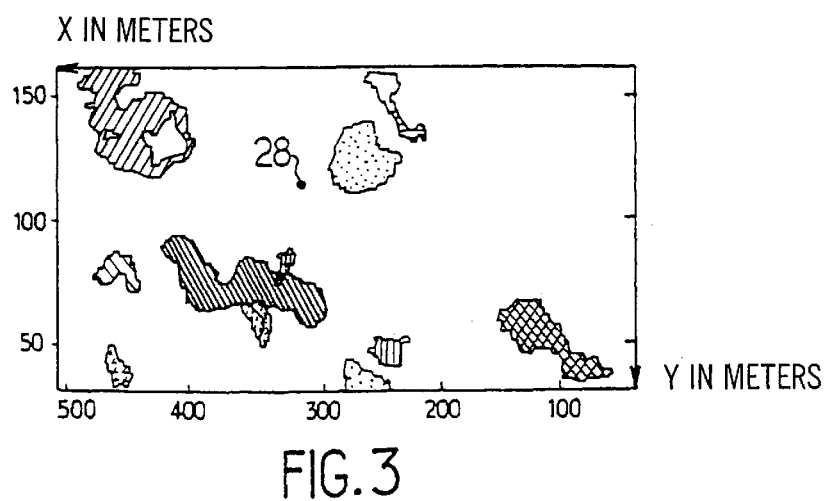
FIG. 3

METHOD FOR CHARTING DRILLABLE ZONES IN AN OILFIELD AVOIDING ANOMALY ZONES

BACKGROUND OF THE INVENTION

This invention relates to a method for mapping drillable areas in an on-shore or off-shore oil field, without the risk of encountering anomalous zones, such as surface gases.

We know that surface gases are located between the surface of the ground and a depth at which the well bore has not yet been equipped with devices that make it possible to stop a potential gas inlet. These gases are a potential and very serious danger when drilling for oil and their location and significance must be evaluated prior to installing a well bore.

Until now, the detection of surface gases was carried out by using the exploration seismic reflection method called two-dimensional (2D). This method consists of gathering seismic traces resulting from the reflection of acoustic waves by the subsoil using an acquisition apparatus that consists of at least one acoustic wave emitting device and one line of acoustic receivers, and that is moved along the surface of the ground (land shooting) or the surface of the sea (marine shooting).

In particular, in 2D marine seismic exploration, the data acquisition equipment consists of a boat equipped with an acoustic impulse emitting source that tows a line or streamer on which are assembled a plurality of equally spaced sensors designed to receive the acoustic waves reflected by the various layers of the subsoil and where each one delivers a signal that represents the amplitude of the waves received in relation to time, this signal is recorded in order to provide a record called seismic trace. The length of the streamer may vary from approximately 500 m to approximately 6000 meters and the sensors fitted on the streamer are spaced from a few meters to several tens of meters apart, for example from around 12.5 meters to 50 meters. The marine area to be studied in the 2D seismic exploration method can range from several hundreds of square kilometers and can, for example, have a surface of 200 km×200 km. The boat covers this area following straight parallel paths, several kilometers apart, for example 5 to 6 km apart. During its movement, the seismic source emits impulses at regular time intervals, for example every 5 seconds. After treating the seismic recordings, for each straight path of the boat we obtain a 2D seismic section consisting of a plurality of vertical traces. This section represents the vertical cut of the subsoil in a system of coordinates X (direction of the boat's movement) and T (depth expressed in time).

In the case of shallow sands saturated with gas, the seismic energy that is reflected can take on significant values that are translated on the recorded seismic section by peaks of high amplitude (bright spots).

In order to reconstruct the image of the subsoil of the area being studied, we must put the various recorded seismic sections side by side and imagine interpolations between the bright spots of such sections. However, these interpolations are lengthy operations that are somewhat subjective. Indeed, it is not unusual for two interpreters to carry out the same interpolations in different ways and come up with maps with different risks.

We also know the three dimensional (3D) seismic acquisition method. This method uses an acquisition device that consists of at least one source that emits acoustic waves and a plurality of lines of acoustic sensors that is moved along the surface of the ground (3D land seismic acquisition) or the surface of the sea (3D marine seismic acquisition). In using this method in marine seismic acquisition, a boat equipped with at least one source of emitting acoustic waves tows several lines or streamers arranged parallel to each other, whose number can reach 8, where each line has a plurality of acoustic wave sensors. The lines are shorter than in the previous 2D seismic acquisition, are separated from each other for example by approximately 50 m and carry sensors that are equally spaced, for example every 25 m. The width of the area covered by the boat increases with the number of lines of sensors and is, for example, in the range of 400 m in the case mentioned above.

With each recorded trace, we associate a spatial position defined using the coordinates of the associated emitting source and sensor at the time of the shot that will produce this trace.

From the recorded seismic traces during the 3D seismic acquisition, we can achieve an image of the subsoil in three dimensions in an (X, Y, T) axial system in the form called "3D seismic cube" (3D seismic section). For this, we attribute to each square (bin) of a set of squares that makes up a regular spatial grid in a plane (X, Y) representative of the acquisition plane of the seismic traces, a central trace obtained from the recorded traces using the well known multiple coverage technique, and whose spatial positions are located inside the square in question, this central trace is assigned to the center of such square following the time-dependent axis T. The seismic block is sampled in elementary parallelepiped fictive cells each centered on a bin and whose dimensions following X and Y correspond to those of such bin and whose width according to T corresponds to the length of the time sample chosen to sample the central seismic trace, each cell contains a sample of seismic trace.

In this way, we obtain a continuous sampling of the subsoil. Any cell $C_{ijk}$ of the seismic block being sampled is therefore perfectly defined by the coordinates $(X_i, Y_j, T_k)$ of its center, or in other words, of the central seismic trace sample that it contains, where $X_i$ and $Y_j$ are the coordinates of the $B_{ij}$ bin associated with the cell and $T_k$ is the time-dependent coordinate of the sample k of the central seismic trace $TR_{ij}$ of bin $B_{ij}$, and by the amplitude $A_{ijk}$ of such sample. The bins that cross-rule the 3D seismic block's (X, Y) plane are preferably rectangular and correspond with rectangles on the ground with, for example, a length of 50 m (distance between the lines) and a width of 25 m (distance between two successive sensors on the line).

The useful information gathered during a shot is concentrated inside a conic volume centered on the space position of the recording (trace). The conic volumes that correspond to two successive shots emitted during the movement of the boat either do not cover each other or only partially cover each other for the surface layers of the subsoil. Therefore, the 3D seismic acquisition method with the parameters used for oil prospecting, whose objective is recognition in depth, is not favorable when emphasizing objects on the surface and in particular surface gases.

Thanks to the EP-A-0 562 687 patent we know of a method for locating hydrocarbon reserves using a structural interpretation of the data. In this method, from hypotheses on the presence of hydrocarbons in a region of interest of the subsoil:

(i) we select areas where the probability that they contain hydrocarbon reserves is greater than a predetermined probability, (ii) we define a structural closure for each of such selected areas from the structural data of the region of interest where each structural closure contains a surface capable of containing a hydrocarbon reserve and having a constant depth perimeter substantially equal to the deepest point of the area, (iii) we determine a measure of the geometric similarity between each area and the structural closure associated thereto, and (iv) we select each of the areas for which this measure exceeds a predetermined value.

However, it is obvious that this method has no relation to the method for mapping consistent with the invention and that the latter does not provide any element susceptible of suggesting in the least part this method.

We also know from the U.S. Pat. No. 5,153,858 patent, that represents the closest state of the technique, a method of automatic horizon pinpointing in a 3D block of seismic cells sampled in depth. In this method, each seismic trace of the 3D block is converted into a binary trace consisting of a sequence of values "1" and values "0", where value "1" is assigned to each sample of the seismic trace for which a horizon exists at the depth defined by this sample, and the value "0" to each sample that does not answer to this condition. In this manner, we transform the 3D block of seismic traces into a corresponding 3D block of binary traces, that is stored in the memory of a computer and is used for the search of automatic horizons. In order to do this, we chose a sample "1" of a binary trace of the 3D block of binary traces, that is located on the horizon to be pinpointed and, operating step by step on the adjacent binary traces, we carry out an automatic sweeping of the binary 3D block to find all samples with a value of "1" that correspond to the initial sample "1". From these depths associated to the selected samples, we create a representation of the sought horizon.

The method consistent with the patent has as starting point a 3D block of seismic traces, but the treatment of this block of seismic data by applying such method is different from the treatment consistent with the invention and leads to a completely different result.

SUMMARY OF THE INVENTION

The inventors of this invention have found that we can use the 3D seismic acquisition method to complete a mapping of the surface areas of the subsoil with a high spatial resolution.

The basic idea that is at the origin of the invention is that the surface gases are events of strong amplitude that can easily be characterized.

Ultimately, an anomalous zone can consist of only one elementary cell.

In order to result in the maps of anomalous zones, all operations of the method that relate to the treatments of the seismic bloc are completed automatically by a computer program with the exception of the choice of the threshold which is left at the discretion of the operator.

One advantage of the method consistent with the invention is that we can use the 3D acquisition data, of which the cost, tied to a lesser acquisition time, is relatively less that the cost of a 2D acquisition method directed at the detection of anomalous zones.

Another advantage of the method consistent with the invention is that it is possible to introduce the notion of an error range by determining several thresholds. We can establish maps of risks with optimistic, pessimistic and intermediary hypotheses.

Yet another advantage of the method consistent with the invention lies in the fact that it is not necessary to know the spatial position of each trace with as much precision as that required for the conventional treatment (imaging) of the 3D seismic data. For example, in marine acquisition, the precision is sufficient if each line of sensors is equipped with only a tail and compass buoy designated to provide information on the declination of the line in relation to the direction of the boat's movement.

According to the invention, the central trace assigned to the center of each bin of the seismic block's (X, Y) plane can, in particular, be a sum trace, obtained by summing a collection of traces, for example at a common midpoint, resulting from the recorded seismic traces in multiple cover, or a trace migrated in time or migrated in depth resulting from the application of a conventional time migration or depth migration technique, and the sum seismic traces and/or the collections of seismic traces.

When the central trace assigned to the center of each bin of the 3D seismic block is a sum trace or a time migrated trace, axis P of the axial system (X, Y, P) used to build the seismic block is a time-dependent axis T. When such central trace is a depth migrated trace, such axis P is a depth axis Z.

BRIEF DESCRIPTION OF THE DRAWINGS

The invention will now be described referring to the attached drawings where:

FIG. 3 is a representation of the XY projection of the selected and coded elementary cells;

FIG. 4 shows the XT projection of the selected and coded elementary cells;

FIG. 5 shows the YT projection of the selected and coded elementary cells;

DETAILED DESCRIPTION OF THE PREFERRED EMBODIMENT

Figure 1:
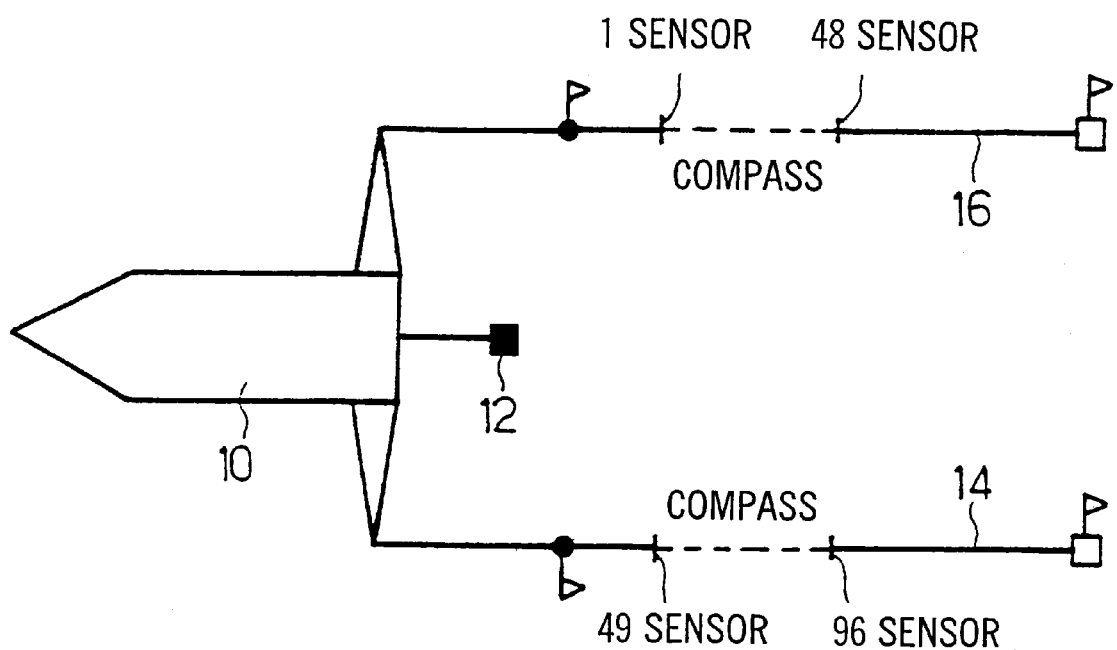
FIG. 1 schematically represents a fully equipped 3D seismic acquisition system.

In reference to FIG. 1, the 3D acquisition system consists of a boat 10 that tows a seismic source 12 that emits acoustic impulses and two lines 14, 16 each equipped with forty eight sensors.

The lines are each 600 m long. The first sensor and the last sensor of each line are equipped with targets that make it possible to identify their position, for example by laser. Some of the intermediary sensors are equipped with compasses that provide information concerning the declination of the line in relation to the direction of the boat's movement.

We applied the method consistent with the invention for the following different simulated acquisition geometries:

1. length of the lines: we tested lines measuring one half (300 m), one quarter (150 m) and one eighth (75 m) of the standard line as well as a line equipped with only one sensor. The distance from the first sensor to the shotpoint or offset was reduced in relation to the usual offset and brought back to around 30 m. As a result, the force of the seismic source is reduced;

2. interval between the shotpoints: the space between the shotpoints is 6.25 m or 12.5 m;
3. line spacing: in the case where several lines are used, the space between the lines is of 25 m or 50 m;
4. measurements of the bin: the following measurements were tested: 6.25×12.5 m; 6.25×25 m; 12.5×25 m and 12.5×50 m.

In all cases mentioned, a satisfactory map of the anomalous zones in answer to the problem was obtained.

The acquisition that is done with one single line of sensors of reduced length and equipped with a small number of sensors would still be satisfactory for the construction of the 3D seismic block. The length of the single line could be 150 meters, 75 meters, and could even at the extreme only have one sensor.

Figure 2:
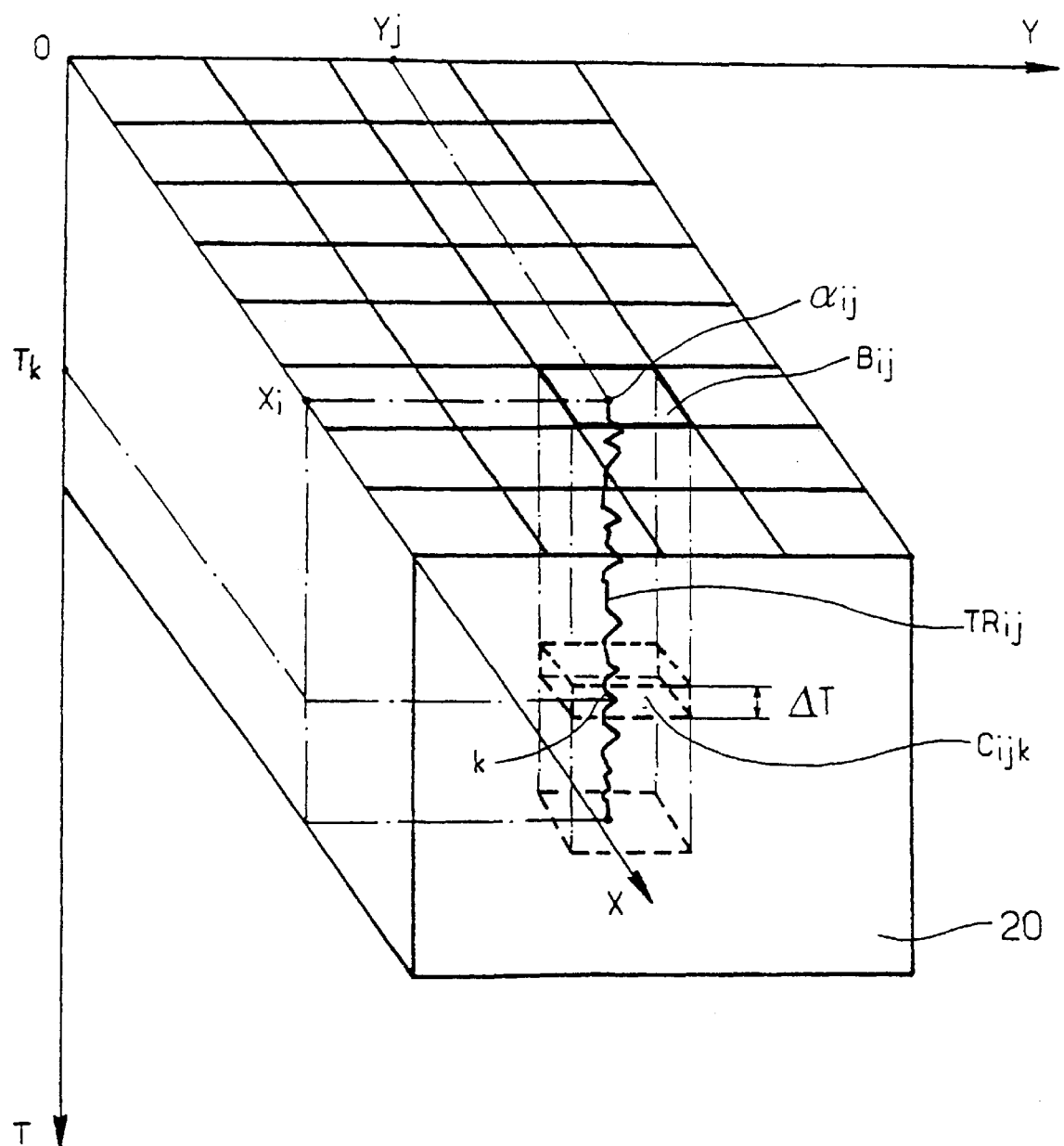
FIG. 2 illustrates a 2D seismic block cross-ruled with bins and sampled in elementary cells in an axial system (X, Y, T)

In reference to FIG. 2, from the seismic traces recorded with the acquisition equipment, we build a 3D seismic block referred to as 20, that is a three dimensional image of the area explored in an orthogonal and normalized time-dependent spatial axial system (X, Y, T) with an apex 0, in which X and Y are the spatial axes and T is the time-dependent axis. First, the plane defined by axes X and Y and which is chosen as a representation of the seismic traces acquisition plane, is cross-ruled by a set of squares that constitute a regular grid that covers a surface of such plane that corresponds to the explored area. To each square (still called bin) of such set, we assign a central trace developed from the recorded traces that have positions located inside the square in question, this central trace is assigned to the center of such square following the time-dependent axis T. Thus, to square $B_{ij}$, we attribute the central trace $TR_{ij}$, where this trace is assigned to the center $\rightarrow_{ij}$ with coordinates $X_i$ and $Y_j$, of square $B_{ij}$ according to the time-dependent axis T.

The seismic block 20 containing a central trace associated to each bin is then sampled in elementary parallelepiped cells, each cell being centered on a bin of the (X, Y) plane and having dimensions following the axes X and Y that correspond respectively to those of the bin on which it is centered and a thickness ΔT according to axis T that corresponds to the sampling interval following T of the central trace associated to such bin. Therefore, each elementary cell contains a sample of a central seismic trace, such sample is defined by its coordinates (X, Y, T) in the seismic block, and such coordinates form the coordinates of the elementary cell containing such sample. Thus, cell $C_{ijk}$, centered on bin $B_{ij}$, has dimensions following axes X and Y corresponding respectively to the dimensions of bin $B_{ij}$ following these same axes and a thickness ΔT corresponding to the time-dependent sample interval of trace $TR_{ij}$. This cell contains the sample k of the seismic trace $TR_{ij}$, the coordinates ($X_i$, $Y_j$, $T_k$) of such sample form the coordinates of the elementary cell $C_{ijk}$. Thus, each cell of the seismic block 20 is well defined by the coordinates (X, Y, T) of the central seismic trace sample it contains and by the amplitude of such cell.

For each elementary cell of the seismic block 20, we calculate the energy of this cell from the amplitude of the sample of central seismic trace it contains, such energy being proportional to the square with this amplitude. In this way, we transform the seismic block 20 into a block consisting of the same elementary cells, each now defined by its coordinates (X, Y, T) as in the block 20 and by its energy.

After having established the energy threshold beyond which we consider that the presence of anomalous zones is likely, we select the cells of the energy block that have an energy equal to or greater than such threshold.

The cells chosen in this manner are then assigned a code so that all the cells belonging to one same set of selected connecting cells have the same code and that the selected cells belonging to different sets of connecting cells have different codes, with each set of selected connecting cells forming an anomalous zone. The codes so assigned to the selected cells may be made up of colors that are different from one anomalous zone to another. For the grouping of selected cells in sets of connecting cells, we consider that two cells are connected if they have at least one edge in common.

Ultimately, an anomalous zone can be made up of one single isolated elementary cell.

For each of the cells that are retained, we keep its defined position in memory using its coordinates (X, Y, T) and its code.

In carrying out an XY projection, or view from above, of the block of cells that have assigned codes, each anomalous zone or bright spot will appear on this projection with a different code, for example, with a different color, which provides a map of the superposed anomalous zones as represented in FIG. 3. In this figure, the position of a well is identified by the reference 28. In this position, the well is not located in an anomalous zone.

Figure 8:
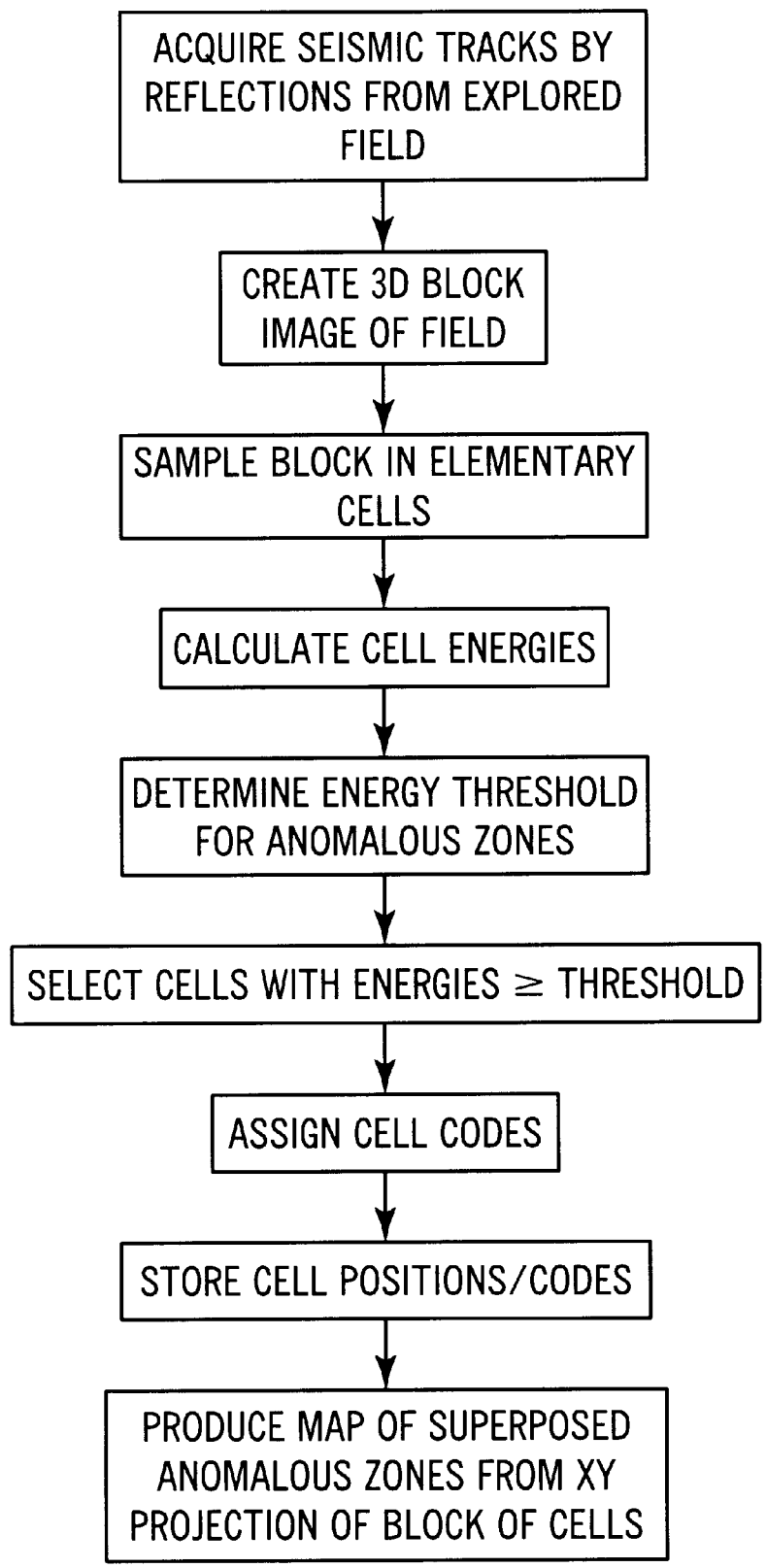
FIG. 8 is a block diagram illustrating the sequence of steps involved in creating a map of anomalous zones in accordance with the invention.

The sequence of method steps described above, which results in the map of FIG. 3, is illustrated in the block diagram of FIG. 8.

We can also carry out an XY projection or a YT projection of the block of cells that have assigned codes, so as to see the cumulated thickness of the anomalous zones following the X axis as represented in FIG. 4 or following the Y axis as represented in FIG. 5, in order to determine the heights at which are located the anomalous zones.

By associating the three projections, we can define the spots and locate them inside the block.

The threshold is chosen in the following manner:
 a) with the help of statistical measures, we estimate the range of possible values that the threshold can have.
 b) inside this range, while observing the extension of the disturbances on the seismic data for the different thresholds, a threshold is chosen.

Figure 6:
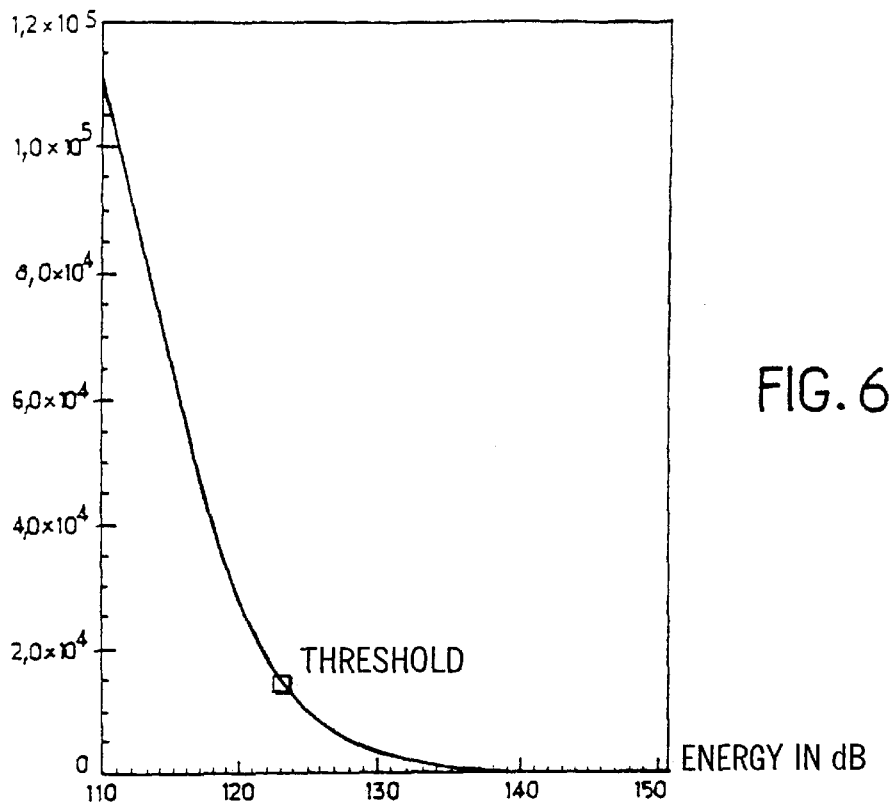
FIG. 6 is a histogram illustrating the number of anomalous cells for each energy threshold.

FIG. 6 represents an example of a histogram of the different energy values, expressed in dB, found in the 3D block as a whole, in relation to the number of cells having these energies. Usually, the value of a threshold to be retained is located at a nick point of the curve. In the example that is illustrated, this threshold is in the range of 123 dB.

Figure 7:
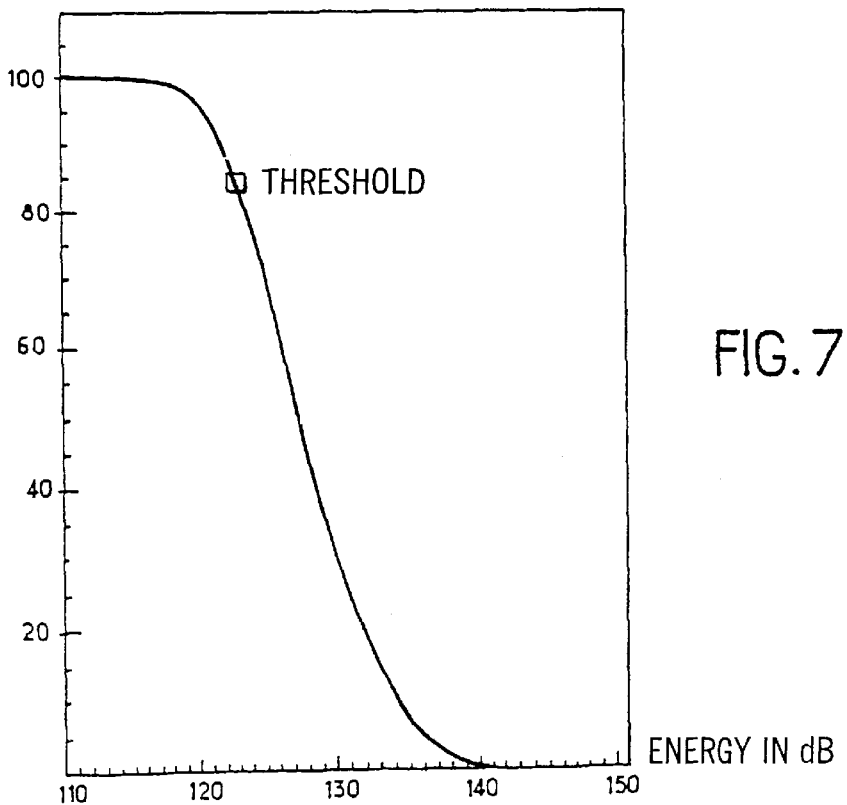
FIG. 7 is a curve illustrating the surface covered by the anomalies in relation to the threshold.

FIG. 7 represents a curve that gives the surface of the disturbances in relation to the threshold.

In the example in these figures, we can see that for thresholds of less than 118 dB, the disturbances cover 100% of the 3D block's surface. The chosen threshold, which is of 123 dB, corresponds to 85% of the covered surface. We can consider this as being a pessimistic hypothesis.

According to the invention, we can vary the energy threshold, for the selection of cells, in relation to the degrees of risks that are determined in order to establish the mapping.

What is claimed is:
1. Method for mapping the drillable areas of an oil field without running the risk of encountering anomalous zones, such method comprising the steps of:
 carrying out an acquisition of recordings or seismic traces using seismic reflection acquisition equipment in the area of the oil field to be explored;
 creating, from these recorded seismic traces, a 3D seismic block that is a three dimensional image of the area explored within an axial system (X, Y, P), while attrib- uting to each square ($B_{ij}$) of a set of squares forming a regular spatial grid in the plane defined by axes (X, Y) and chosen as a representation of the acquisition plane of the seismic traces, a central trace ($TR_{ij}$) established from the recorded traces whose positions are located inside the square in question, this central trace having been assigned to the center ($\alpha_{ij}$) of such square following the axis P, and sampling the 3D seismic block in elementary cells, each cell ($C_{ijk}$) being centered on a square ($B_{ij}$) of the plane (X, Y) and having measurements following the axes X and Y that correspond respectively to those of the square on which it is centered and a thickness according to axis P that corresponds to a sample interval following axis P of the central trace associated with such square, so that each elementary square contains a sample (k) of a central seismic trace defined by its coordinates (X, Y, P) in such seismic block, and where such coordinates form the coordinates of the elementary cell that contains the sample, and comprising;

calculating, for each elementary cell ($C_{ijk}$) of the seismic block, the energy of this cell from the amplitude of the seismic trace sample it contains, such energy being proportional to the square with this amplitude, determining an energy threshold beyond which we consider that the presence of anomalous zones is probable;

selecting the cells of the block that have energies equal to or greater than such threshold, assigning a code to the selected cells, so that all of the cells belonging to a same set of selected connecting cells have the same code and that the selected cells belonging to different sets of selected connecting cells have different codes, each set of selected connecting cells forms an anomalous zone, memorizing the position (X, Y, P) of each of the cells retained as well as its code, and carrying out an XY projection of the block of cells that have been assigned these codes, where each anomalous zone appears in this projection with a different code, which provides a map of the superposed anomalous zones.

2. Method as set forth in claim 1, further comprising carrying out an XP projection or a YP projection of the block of cells that have been assigned codes, so as to make the cumulated thickness of the anomalous zones appear following the X axis or the Y axis, in order to determine the heights at which the anomalous zones can be found.

3. Method as set forth in claim 1, comprising codes assigned to the elementary cells are made up of different colors attributed to each anomalous zone.

4. Method as set forth in claim 1, comprising varying the energy threshold in relation to the degrees of risks that are determined in order to create the map.

* * * * *